(12) United States Patent
Nakajima et al.

(10) Patent No.: US 9,463,842 B2
(45) Date of Patent: Oct. 11, 2016

(54) BICYCLE WHEEL SECURING STRUCTURE

(71) Applicant: Shimano Inc., Sakai, Osaka (JP)

(72) Inventors: Jun Nakajima, Osaka (JP); Kazuki Koshiyama, Osaka (JP)

(73) Assignee: Shimano Inc., Osaka (JP)

( * ) Notice: Subject to any disclaimer, the term of this patent is extended or adjusted under 35 U.S.C. 154(b) by 268 days.

(21) Appl. No.: 14/296,154

(22) Filed: Jun. 4, 2014

(65) Prior Publication Data
US 2015/0069827 A1 Mar. 12, 2015

(30) Foreign Application Priority Data

Sep. 9, 2013 (JP) .................................. 2013-186108
Apr. 28, 2014 (JP) .................................. 2014-092902

(51) Int. Cl.
*B62K 25/02* (2006.01)

(52) U.S. Cl.
CPC ........... *B62K 25/02* (2013.01); *B62K 2206/00* (2013.01)

(58) Field of Classification Search
CPC ... B62K 25/00; B62K 25/02; B62K 2206/00
USPC ................................. 301/110.5, 124.1, 124.2
See application file for complete search history.

(56) References Cited

U.S. PATENT DOCUMENTS

| 7,537,291 B2* | 5/2009 | Hara | B60B 27/026 301/110.5 |
| 7,628,416 B2* | 12/2009 | Hara | B62K 25/02 280/260 |
| 2008/0197602 A1* | 8/2008 | Watarai | B62K 25/02 280/281.1 |
| 2008/0211296 A1* | 9/2008 | Takachi | B62K 25/02 301/124.2 |
| 2008/0284127 A1* | 11/2008 | Watarai | B62K 25/02 280/279 |
| 2009/0115241 A1* | 5/2009 | Kanehisa | B62K 25/02 301/124.2 |
| 2010/0096912 A1* | 4/2010 | Lude | B62K 25/02 301/110.5 |

* cited by examiner

*Primary Examiner* — S. Joseph Morano
*Assistant Examiner* — Jean Charleston
(74) *Attorney, Agent, or Firm* — Global IP Counselors

(57) ABSTRACT

A bicycle wheel securing structure is provided with a shaft member, a head member, a lever member, an adjustment member and a positioning mechanism. The shaft member has a first end portion, a second end portion and an engaging part. The head member is movably disposed on the first end portion. The lever member is movably provided on the head member around a pivot axis that intersects with an axial direction of the shaft member to move the shaft member in the axial direction with respect to the head member. The adjustment member is movably provided on the head member in the axial direction and that can adjust a final fixing position of the lever member. The positioning mechanism is provided between the head member and the adjustment member to selectively maintain a position of the adjustment member in a plurality of axially spaced apart locations.

19 Claims, 12 Drawing Sheets

BICYCLE WHEEL SECURING STRUCTURE

CROSS-REFERENCE TO RELATED APPLICATIONS

This application claims priority to Japanese Patent Application No. 2013-186108, filed on Sep. 9, 2013, and Japanese Patent Application No. 2014-092902, filed on Apr. 28, 2014. The entire disclosures of Japanese Patent Application Nos. 2013-186108 and 2014-092902 are hereby incorporated herein by reference.

BACKGROUND

1. Field of the Invention

This invention generally relates to a bicycle wheel securing structure. More specifically, the present invention relates to a bicycle wheel securing structure for detachably securing a wheel to the frame of a bicycle.

2. Background Information

A bicycle wheel securing structure for detachably securing a wheel to the frame of a bicycle is conventionally known (for example, U.S. Pat. No. 7,537,291). A conventional bicycle wheel securing structure comprises a shaft member, a head member, a lever member and an adjustment member. The shaft member comprises a threaded portion that can be screwed to the frame. The head member is movable in an axial direction with respect to the shaft member. The head member rotates with the shaft member. The lever member is movably provided on the head member around an axis that intersects with the axial direction. The lever member moves the shaft member in the axial direction with respect to the head member by moving the lever member. The adjustment member has a male threaded portion that screws into the outer peripheral surface of the head member and the adjustment member also has a slit for stopping the rotation. By narrowing the width of this slit with the threaded member, the rotation of adjustment member is stopped on the outer peripheral surface of the head member. The adjustment member is movable in the axial direction to adjust the position of the lever member around the axis. The adjustment member is provided so that the lever member is disposed along the frame. The adjustment member can abut the frame.

In a conventional wheel securing structure configured in this way, when securing a wheel to the frame, the threaded member of the adjustment member is loosened so that the adjustment member is turned to a position that is further retracted than the head member. In this state, the lever member is disposed in a direction along the hub shaft and then is turned around the hub axis in a tightening direction. This turning of the lever member causes the thread of the shaft member to be screwed into the frame. When the shaft member is screwed into the frame, if the lever member is pivoted in a direction that intersects the axial direction, the shaft member is drawn into the lever member side due to the action of the cam. At this time, if the final position of the lever member is not along the frame (for example, the front form, the chain stay, or the seat stay) but is away from the frame, there is the risk that the lever member will hit an obstacle. In order to avoid this, in a conventional wheel securing structure, when the lever member is pivoted, the lever member is screwed into a position in which the lever member would be disposed along the frame and the adjustment member is turned in this state to put the adjustment member in contact with the frame. Then, the threaded member is tightened to stop the rotation of the adjustment member. When the rotation of the adjustment member is stopped, the lever member is pivoted around an axis that intersects the axial direction and the lever is rotated to the final fixing position to complete the securing of the wheel. With this kind of configuration, the gap between the head member and the frame can be adjusted with the adjustment member, so that the final fixing position of the lever member can be adjusted. Furthermore, as long as the frame is the same, when removing the wheel and resecuring the wheel, the final fixing position of the lever member does not have to be readjusted.

SUMMARY

Generally, the present disclosure is directed to various features of a bicycle wheel securing structure. In a conventional bicycle wheel securing structure, as mentioned above, the slit is narrowed with the threaded member and the rotation of the adjustment member is stopped, so that the adjustment member will not move in the axial direction. For this reason, a tool to turn the threaded member becomes necessary, so that the rotation of the adjustment member cannot be easily stopped. Additionally, since a slit and a hole to pass through the threaded member are provided in the adjustment member, if foreign matter enters the slit or the hole, stopping the rotation of the adjustment member becomes more difficult.

One object of the present invention is to easily stop the rotation of the adjustment member in a bicycle wheel securing structure that can adjust the final fixing position of the lever member.

The bicycle wheel securing structure according to the present invention comprises a shaft member, a head member, a lever member, an adjustment member and a positioning mechanism. The shaft member has a first end portion, a second end portion and an engaging part. The second end portion is different from the first end portion. The engaging part is formed in the second end portion and configured to engage with a frame of a bicycle. The head member is movably disposed on the first end portion. The lever member is movably provided on the head member around a pivot axis that intersects with an axial direction of the shaft member to move the shaft member in the axial direction with respect to the head member. The adjustment member is movably provided on the head member in the axial direction and that can adjust a final fixing position of the lever member. The positioning mechanism is provided between the head member and the adjustment member to selectively maintain a position of the adjustment member in a plurality of axially spaced apart locations.

In this bicycle wheel securing structure, in the case of securing the wheel to the frame, the lever member is moved in a direction along the axial direction of the shaft member. Then, after attaching the shaft member to the frame, the shaft member is turned with the lever member to engage the engaging part with the frame. At this time, when the lever member is turned in a direction intersecting the axial direction of the shaft member, the lever member moves the shaft member to face a direction along the frame. In this state, the adjustment member is turned so that the adjustment member makes contact with the frame. At this time, the adjustment member is turned until the adjustment member makes contact with the frame and to a position in which the positioning mechanism can position the adjustment member. In this state, the lever member is turned in a direction intersecting the axial direction, the lever is disposed in the final fixing position and the wheel is fixed to the frame. With this, the lever member will be disposed in a direction along the frame. Here, the adjustment member can be positioned in the axial direction with the positioning mechanism. Therefore, the rotation of the adjustment member can be easily stopped in a bicycle wheel securing structure that can adjust the final fixing position of the lever member.

The shaft member can comprise a first shaft part and a second shaft part. The first shaft part includes the second end portion and the engaging part. The second shaft part includes the first end portion. The second shaft part is a separate member that is attached to the first shaft part. The second shaft part is partially covered by the head member. In this case, since the shaft member is configured by the first shaft part and the second shaft part, attaching the head member on the first end portion side is easy.

The head member can comprise a circular outer peripheral surface with a first threaded portion that is formed on the outer peripheral surface, and the adjustment member can comprise a second threaded portion that screws onto the first threaded portion and a contacting portion that is arranged to contact with the frame while the bicycle wheel securing structure is secured to the frame. In this case, since the adjustment member and the head member engage via a screw, the axial position of the adjustment member can be finely adjusted.

The positioning mechanism can comprise at least one positioning member, an engaging portion and a biasing member. The at least one positioning member is movably arranged in a direction that is perpendicular to the axial direction of one of the head member and the adjustment member. The engaging portion is provided on the other of the head member or the adjustment member, and can engage the positioning member in one of a plurality of circumferentially arranged locations. The biasing member biases the positioning member toward the engaging portion. In this case, if the adjustment member is moved to the location where the engaging portion is formed, the positioning member that is biased toward the engaging portion will engage with the engaging portion and the adjustment member will be positioned.

The positioning member can also be movably provided on the head member. In this case, since installing a positioning member that moves in the radial direction to the adjustment member that rotates in the screwing direction is not necessary, the thickness of the adjustment member in the radial direction can be reduced.

The engaging member can comprise a plurality of circumferentially spaced apart recesses, and the positioning member can comprise at least one protrusion that engages with the recesses. If the recesses of the engaging member are formed recessed in an arc along the screwing direction of the adjustment member, when the adjustment member is turned further after positioning, the protrusion of the positioning member can be engaged with the next recess of the engaging member. With this, positioning member can be positioned in a plurality of locations with the one cycle of the rotation in the screwing direction of the adjustment member and the rotation of the adjustment member can be stopped.

The positioning mechanism can comprise at least one positioning member, an engaging portion and a biasing member. The at least one positioning member is movably disposed in a direction that is perpendicular to the axial direction of one of the head member and the adjustment member, and is immovably in a circumferential direction with respect to the one of the head member and the adjustment member having the at least one positioning member provided thereon. The engaging portion is provided on the other of the head member or the adjustment member, and can engage with the positioning member in one of a plurality of circumferentially arranged locations. The biasing member biases the positioning member toward the engaging portion. In this case, if the adjustment member is moved to the location where the engaging portion is formed, the positioning member that is biased toward the engaging portion will engage with the engaging portion and the adjustment member will be positioned.

The positioning member can also be provided in the head member. In this case, since installing a positioning member that moves in the axial direction to the adjustment member that rotates in the screwing direction is not necessary, the thickness of the adjustment member in the axial direction can be reduced.

The positioning member can comprise a plurality of circumferentially spaced apart recesses, and the engaging portion can comprise at least one protrusion that engages with the recesses. If the recesses of the positioning member are formed recessed in an arc along the screwing direction of the adjustment member, when the adjustment member is turned further after positioning, the protrusion of the engaging portion can be engaged with the next recess of the positioning member. With this, the engaging portion can be positioned in a plurality of locations with the one cycle of the rotation in the screwing direction of the adjustment member and the rotation of the adjustment member can be stopped.

The bicycle wheel securing structure can further comprise a movement regulation part that regulates the movement to at least one of either a first axial direction or a second axial direction that is opposite of the first axial direction. In this case, with the movement regulation part, for example, by regulating at least one of either the movement toward the frame or the movement away from the frame, unnecessary rotation can be prevented and the adjustment of the final fixing position of the lever member can be carried out in a short period of time.

The movement regulation part can regulate movement in both the first axial direction and the second axial direction. In this case, since the movement range of the adjustment member in the axial direction is regulated, unnecessary rotation can be further prevented and an adjustment can be carried out in a short period of time.

The movement regulation part can regulate the movement of the adjustment member in the first and second axial directions so that the adjustment member rotates around a center axis of the shaft member by a prescribed amount. In this case, if the configuration is such that, with a rotation within a prescribed amount, the final fixing position of the lever member can be adjusted in a range of 360°, unnecessary rotation can be further prevented and the adjustment of the final fixing position can be carried out in a short period of time.

The movement regulation part can also comprise an O-ring and an annular recess. The O-ring is disposed on either the head member or the adjustment member. The annular recess is formed on the other of the head member or the adjustment member so as to make contact with the O-ring while moving and the annular recess has a longer axial direction length than the wire diameter of the O-ring. In this case, since the movement in the first axial direction and the second axial direction can be regulated with the annular recess making contact with the O-ring, the movement of the adjustment member can be regulated elastically.

The movement regulation part can also have a flange member that is disposed on the head member to regulate the movement in the first axial direction. In this case, since the movement of the adjustment member can be regulated with the flange member that protrudes in the radial direction, the movement of the adjustment member can be regulated with a simple configuration.

The movement regulation part can also have a protruding member that is disposed on the head member to regulate the movement in the first axial direction. In this case, the movement of the adjustment member can be easily regulated with, for example, the protruding member that protrudes in the radial direction.

The movement regulation part can also have a regulating projection that is provided on the outer peripheral surface of the head member so as to make contact with the adjustment member in order to regulate the movement of the adjustment member in the second axial direction. In this case, the movement of the adjustment member in the second axial direction can be easily regulated with the regulating projection.

The adjustment member can comprise a protrusion that covers the gap between the adjustment member and the regulating projection that is generated when the adjustment member is separated from the regulating projection. In this case, since the gap between the adjustment member and the regulating projection for controlling the position can be covered with the protrusion, foreign matter will not easily enter the outer peripheral surface of the head member and the movement of the adjustment member will be less likely to be inhibited. Additionally, foreign matter will not easily enter the positioning mechanism.

The lever member can have a rotating shaft that is rotatably provided around an axis that intersects the axial direction, a lever main body that is provided integrally and rotatably with the rotating shaft and a cam structure that is movable relative to the head member in the axial direction in response to the rotation of the head member. In this case, if the lever main body is turned around the rotating shaft, the shaft member moves in the axial direction due to the cam structure and the securing and the fix releasing of the wheel securing structure to the frame can be easily carried out.

The rotation of the adjustment member can be easily stopped in a bicycle wheel securing structure that can adjust the final fixing position of the lever member.

Also other objects, features, aspects and advantages of the disclosed bicycle wheel securing structure will become apparent to those skilled in the art from the following detailed description, which, taken in conjunction with the annexed drawings, discloses one embodiment of the bicycle wheel securing structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
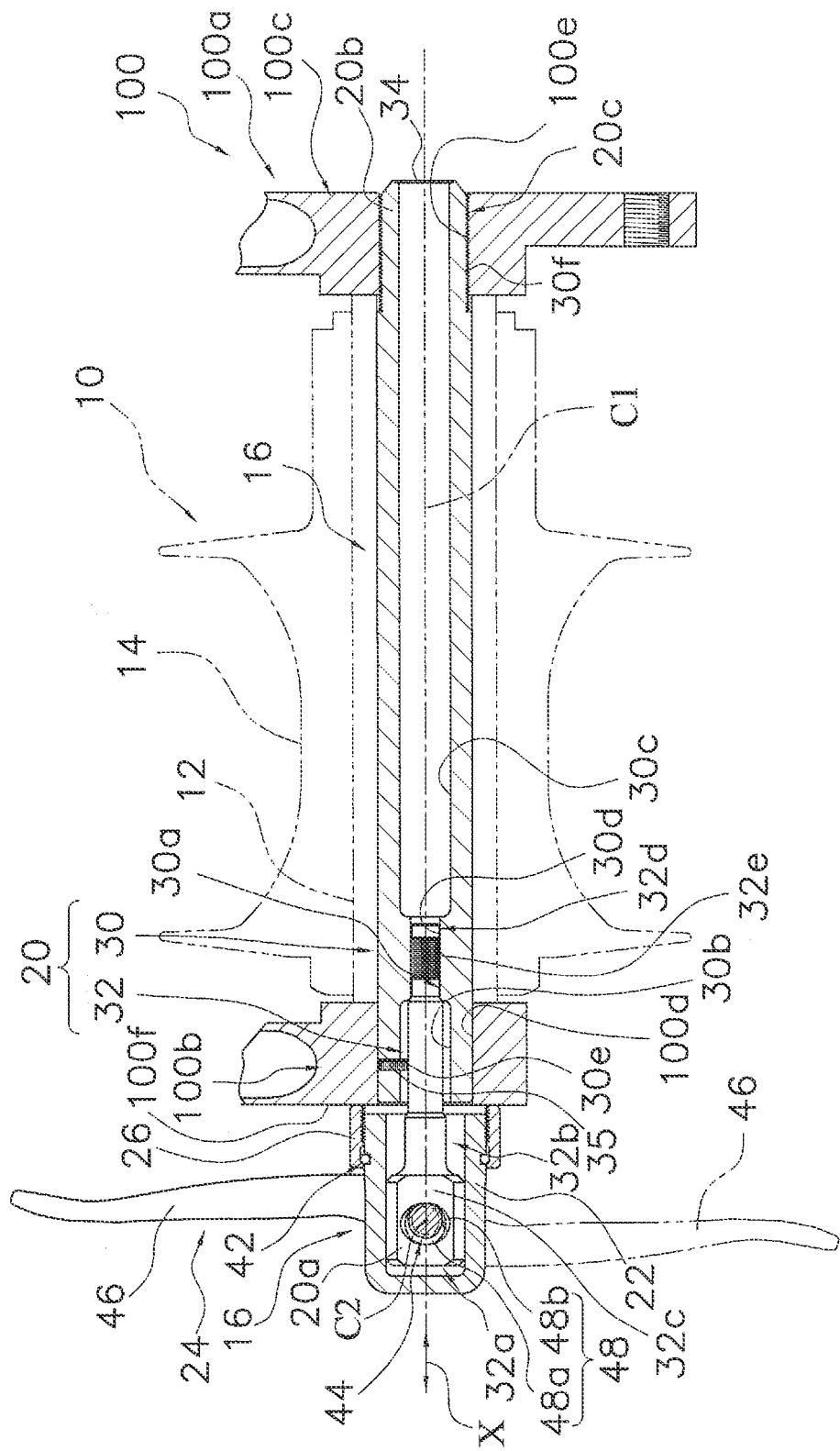
FIG. 1 is a cross-sectional view of a bicycle hub that includes a bicycle wheel securing structure according to a first embodiment.

Referring initially to FIG. 1, a bicycle hub 10 is illustrated that includes a bicycle wheel securing structure 16 according to the first embodiment. Hereinafter, the bicycle wheel securing structure 16 will be simply referred to as the wheel securing structure. The wheel securing structure 16 fixes a wheel of a bicycle to a frame 100 of the bicycle. Specifically, this structure fixes the hub 10 of the wheel of the bicycle to the frame 100.

FIG. 1 is a cross-sectional view of a state in which the wheel securing structure 16 is mounted to the frame 100 of the bicycle as seen from the rear of the bicycle. Additionally, in the following explanation, regarding the front, the rear, the left and the right, in a state in which the wheel securing structure 16 is mounted to the bicycle, "front" represents the traveling direction side of the bicycle and "rear" represents the side in the direction opposite to the traveling direction. Furthermore, "left" represents the left side and "right" represents the right side when looking at the bicycle from the rear.

The frame 100 comprises a wheel securing part 100a for securing the bicycle hub 10. In the first embodiment, the wheel securing part 100a separately comprises a first rear end 100b and a second rear end 100c. A first through-hole 100d is formed at the distal end portion of the first rear end 100b. A second through-hole 100e is formed at the second rear end 100c. The first through-hole 100d is a normal circular hole. The second through-hole 100e is a female threaded bore. Instead of the second through-hole 100e, a nut member can be provided in the first rear end 100b either non-rotatably or rotatably.

In the first embodiment, the bicycle hub 10 is a rear hub that can be mounted on the rear part of the frame 100. The hub 10 basically comprises a hub shaft 12 and a hub shell 14. The hub shaft 12 is fixed to the first rear end 100b and the second rear end 100c. The hub shell 14 is rotatably mounted to the hub shaft 12. The hub 10 is mounted to the wheel securing part 100a by the wheel securing structure 16. Specifically, the wheel securing structure 16 detachably fixes the hub shell 12 to the first rear end 100b and the second rear end 100c. The wheel securing structure 16 is a bicycle wheel securing structure according to one embodiment of the present invention.

The hub shaft 12 is a hollow shaft member. A first end (the left end in FIG. 1) of the hub shaft 12 contacts the first rear end 100b and a second end (the right end in FIG. 1) contacts the second rear end 100c. The wheel securing structure 16 extends through the hub shaft 12.

Figure 2:
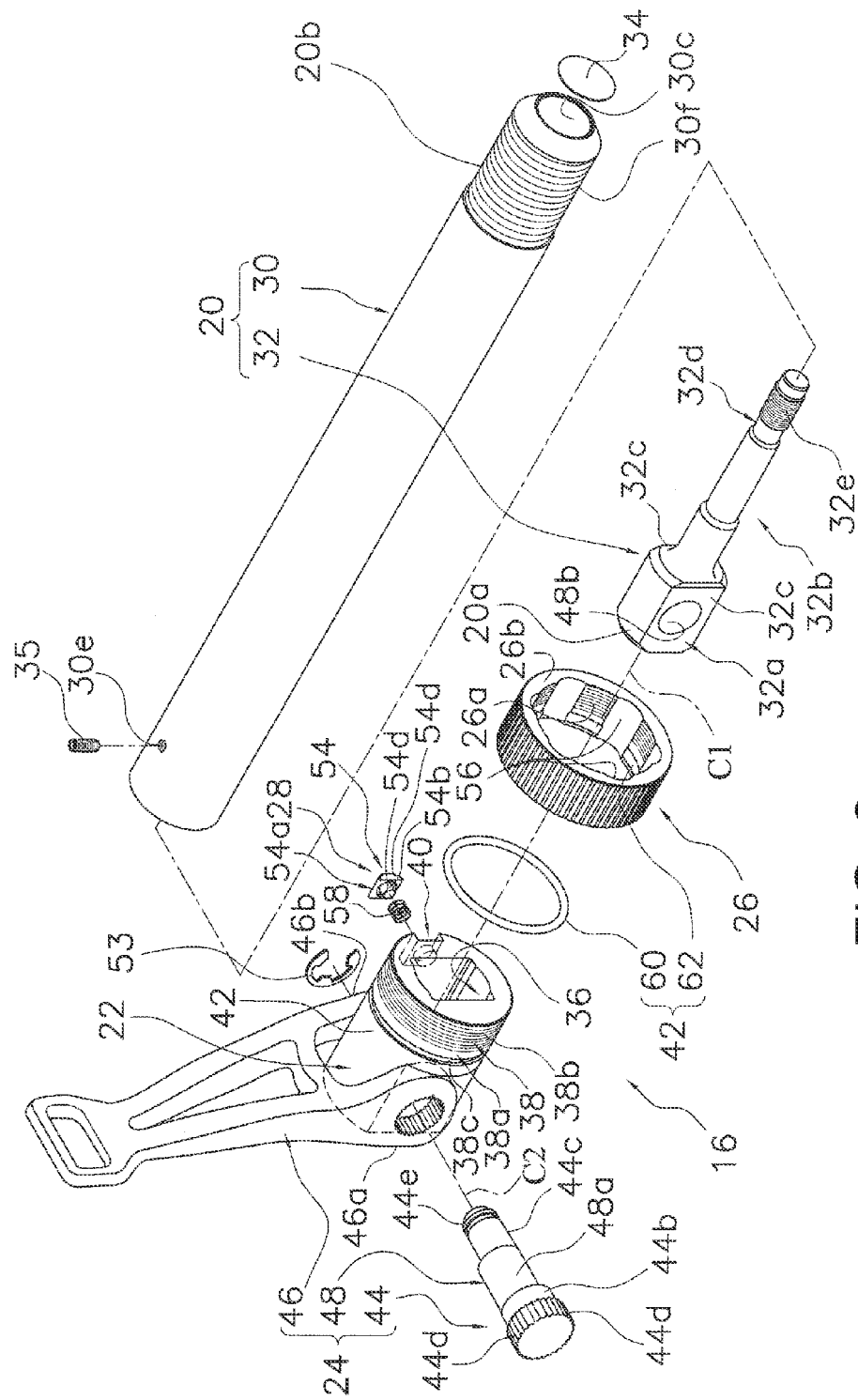
FIG. 2 is an exploded perspective view of the bicycle wheel securing structure of the first embodiment.

As shown in FIGS. 1 and 2, the wheel securing structure 16 comprises a shaft member 20, a head member 22, a lever member 24, an adjustment member 26, a positioning member 28 (refer to FIG. 2) and a movement regulation part 42. The shaft member 20 comprises a first end portion 20a, a second end portion 20b and an engaging part 20c. The second end portion 20b is different from the first end portion 20a. The engaging part 20c is provided in the second end portion 20b and can engage with the frame 100. The head member 22 is provided on the first end portion 20a of the shaft member 20. The head member 22 is configured to move with respect to the shaft member 20 in an axial direction X of a center axis C1 of the shaft member 20. The lever member 24 is movably provided on the head member 22 around an axis C2 that intersects with the center axis C1. The lever member 24 moves relative to the shaft member 20 in the axial direction X of the center axis C1 with respect to the head member 22. The adjustment member 26 is movably provided on the head member 22 to move in the axial direction X. The adjustment member 26 can adjust the position of the lever member 24 around the center axis C1 when the wheel securing structure 16 fixes the hub 10 to the frame 100. The positioning mechanism 28 is provided between the head member 22 and the adjustment member 26. The positioning mechanism 28 can selectively maintain the position of the adjustment member 26 in a plurality of axially spaced apart locations with respect to the axial direction X. The movement regulation part 42 regulates the movement of the adjustment member 26 in at least one of either the first axial direction X1, which is the direction away from the head member 22 or the second axial direction X2, which is opposite to the first axial direction X1. In the first embodiment, the movement regulation part 42 regulates the movement of the adjustment member 26 in the axial direction X, which includes the first axial direction X and the second axial direction X2.

The shaft member 20 comprises a first shaft part 30 and a second shaft part 32. The first shaft part 30 includes the second end portion 20b and the engaging part 20c. The second shaft part 32 includes the first end portion 20a. The second shaft part 32 is fixed to the first shaft part 30. The second shaft part 32 is partially covered by the head member 22. The first shaft part 30 is a hollow tube-like member. The first shaft part 30 has a first hole portion 30a, a second hole portion 30b and a third hole portion 30c. The second shaft part 32 is fixed within the first hole portion 30a of the first shaft part 30 on the side of the first end portion 20a. In particular, the first hole portion 30a has a female threaded portion 30d, and the second shaft part 32 screws into the female threaded portion 30d for fixing the second shaft part 32 to the first shaft part 30. The second hole portion 30b is located on the side of the first hole portion 30a that is locate near the first end portion 20a. The second hole portion 30b is larger in diameter than the first hole portion 30a. The third hole portion 30c is located on the side of the first hole portion 30a that is locate near the second end portion 20b. The third hole portion 30c is larger in diameter than the first hole portion 30a. A threaded bore 30e extends in the radial direction from the outer peripheral surface and opens in the second hole portion 30b. A set screw 35 is screwed into the threaded bore 30e. The set screw 35 engages the second shaft part 32 to stop the rotation of the second shaft part 32 with respect to the first shaft part 30. The set screw 35 is, for example, a hollow set (a hexagon socket set screw) with a sharp point. The engaging part 20c comprises a male threaded portion 30f. The male threaded portion 30f can be screwed into the second through-hole 100e, which is in the form of a female threaded bore. The third hole portion 30c of the first shaft part 30 is closed by a cover member 34 that is fixed to end surface of the second end portion 20b.

The second shaft part 32 comprises a support portion 32a and a shaft part 32b. The shaft part 32b is integrally formed with the support portion 32a as a one-piece member. This shaft part 32b is smaller in width than the support portion 32a. As shown in FIG. 2, the support portion 32a is non-circular in shape. In particular, the support portion 32a is a part having cross sectional shape of a cylinder but with portions removed to form a pair of parallel planes 32c. Both ends of the support portion 32a are C-chamfered in the axial direction X. Additionally, the connecting portion of the support portion 32a and the shaft part 32b are R-chamfered. Thus, when the first shaft part 30 is pulled with the lever member 24 to the side of the lever member 24 via the second shaft part 32, stress concentration is less likely to act.

As shown in FIGS. 1 and 2, a rotating shaft 44 includes a cam portion 48a, while the support portion 32a has a cam hole 48b. A cam structure 48 is formed by the cam portion 48a and the cam hole 48b as mentioned below. The cam hole 48b extends perpendicularly between the pair of planes 32c. The diameter of the shaft part 32b becomes gradually smaller in a plurality of steps (for example, in three steps). A distal end 32d of the shaft part 32b is formed with a male threaded portion 32e. The distal end portion 32d of the shaft part 32b is the portion the shaft part 32b that has a minimum diameter. The male threaded portion 32e can be screwed into the first hole portion 30a of the first shaft part 30.

Figure 4:
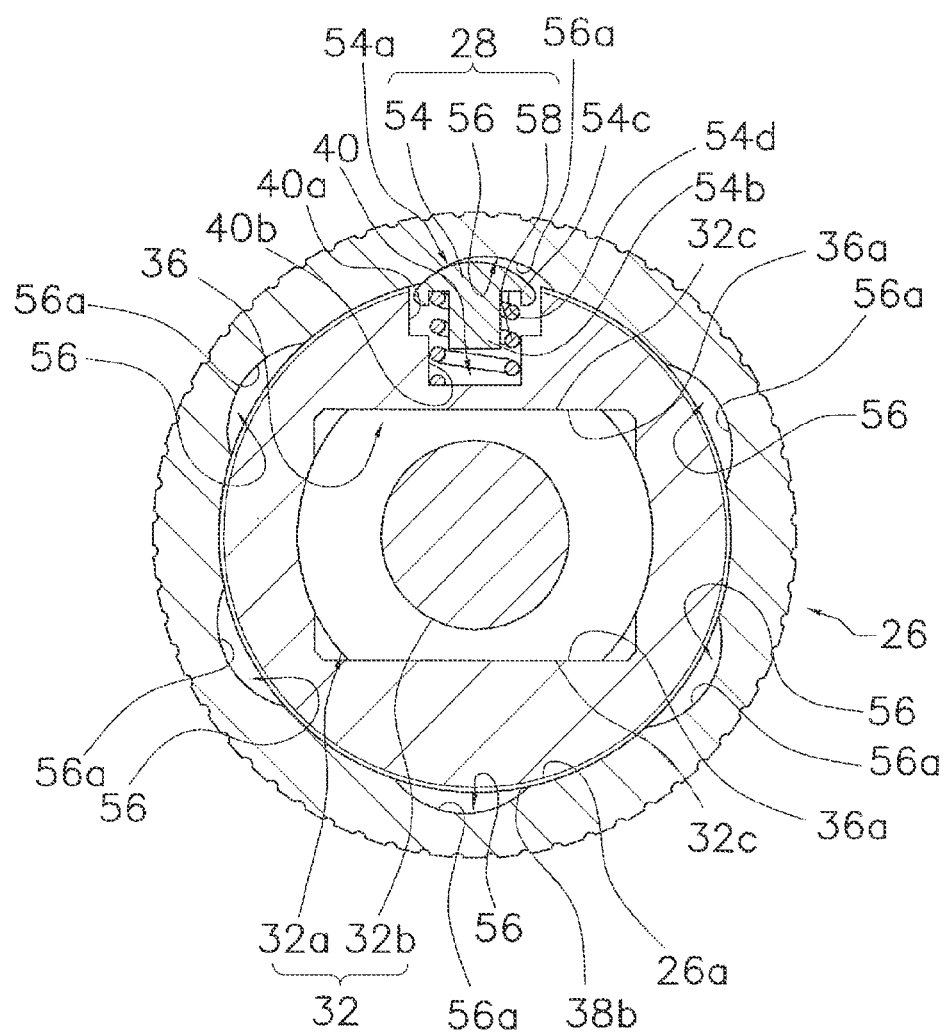
FIG. 4 is a cross-sectional view of the bicycle wheel securing structure taken along the section line IV-IV in FIG. 3.

As shown in FIGS. 1 and 4, the head member 22 is a cup-shaped member that has a bottomed tubular shape. The head member 22 houses the support portion 32a of the second shaft part 32 and the positioning mechanism 28. The head member 22 rotatably supports the lever member 24 so as to be disposed in a first position shown by the solid line in FIG. 1, i.e., the final fixing position and a second position shown by the chain double-dashed line. The head member 22 comprises a shaft housing portion 36, an adjustment part 38 and a mechanism housing portion 40. The shaft housing portion 36 houses the support portion 32a of the second shaft part 32. The shaft housing portion 36 and the support portion 32a of the second shaft part 32 are coupled together so as to rotate together as a unit around the axis C1 and to be movable in the axial direction X. The adjustment part 38 is formed so that the adjustment member 26 is movable in the axial direction. The mechanism housing portion 40 movably houses parts of the positioning mechanism 28.

As shown in FIG. 4, the shaft housing portion 36 has a pair of planar parts 36a forming a portion of an inner peripheral part 36b. The planar parts 36a engage with the planes 32c of the support portion 32a whose cross section is non-circular in shape. On the shaft housing portion 36 are formed a first supporting hole 36c and a second supporting hole 36d. The first supporting hole 36c rotatably supports the rotation shaft 44 of the lever member 24, as mentioned below. The second supporting hole 36d is smaller in diameter than the first supporting hole 36c. The rotation shaft 44 extends through the planar part 36a.

The adjustment member 38 comprises a circular outer peripheral surface 38a and a male threaded portion 38b. The male threaded portion 38b engages the adjustment member 26 on the outer peripheral surface 38a. The male threaded portion 38b is an example of a first threaded portion. Additionally, on the outer peripheral surface 38a is formed an annular groove 38c for mounting the O-ring 60. The O-ring 60 is part of the movement regulation part 42. The annular groove 38c is located closer to the shaft housing portion 36 than the male threaded portion 38b. The mechanism housing portion 40 comprises a first recess 40a and a second recess 40b. The first recess 40a is rectangularly recessed from the outer peripheral surface 38a of the adjustment member 38. The second recess 40b is cylindrically recessed from the center of the first recess 40a. The first recess 40a opens to the distal end portion of the adjustment member 38.

Figure 3:
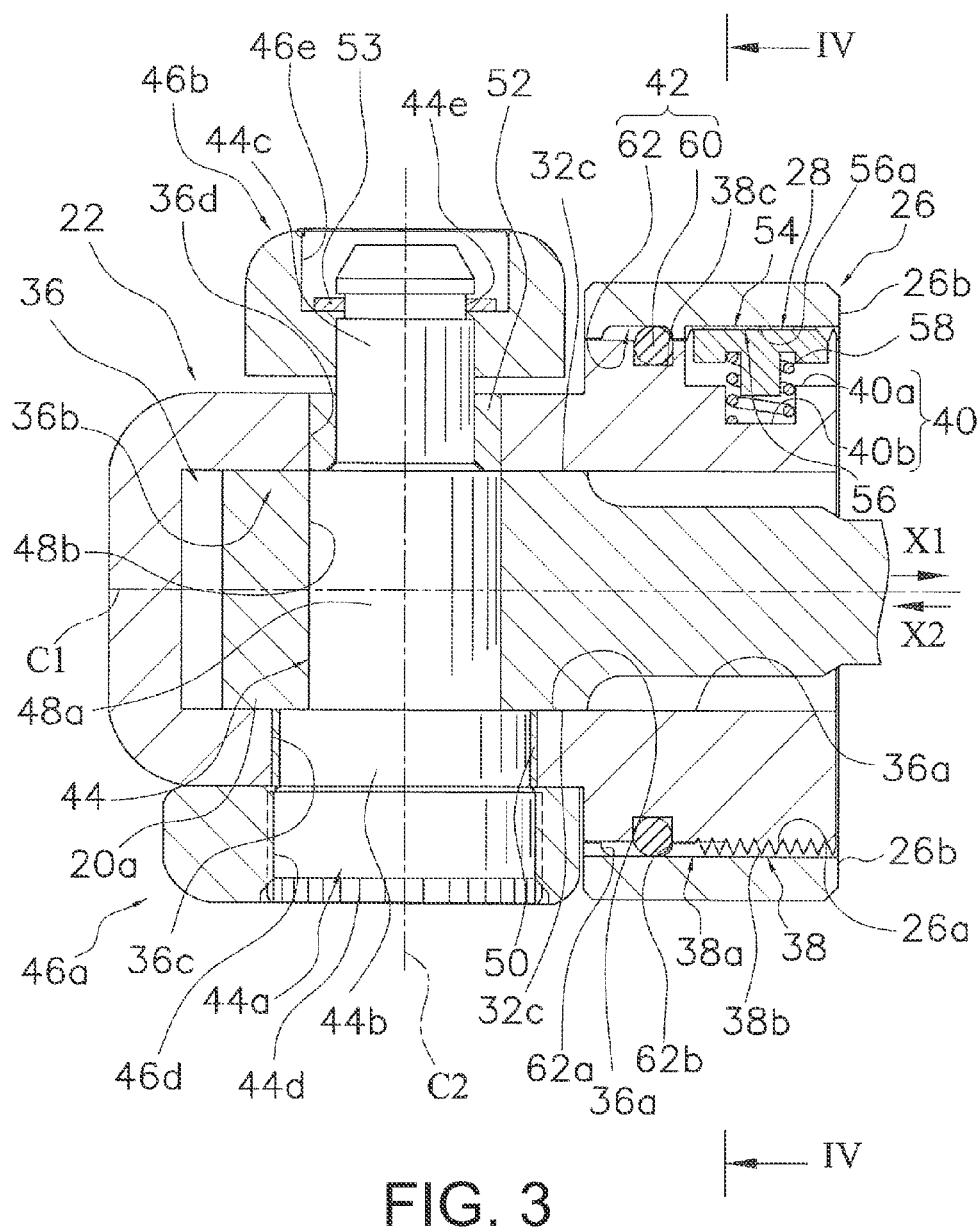
FIG. 3 is a cross-sectional view of the bicycle wheel securing structure near the head member of the bicycle wheel securing structure of the first embodiment.

The lever member 24 comprises the rotating shaft 44, a lever main body 46 and the cam portion 48a of the cam structure 48. The rotating shaft 44 is rotatably provided on the head member 22 around an axis C2 that intersects with the center axis C1 of the shaft member 20. The lever main body 46 is integral with the rotating shaft 44 to rotate as a unit. The cam portion 48a of the cam structure 48 engages the cam hole 48b of the second shaft part 32 to move the shaft member 20 in the axial direction X in response to the rotation of the lever member 46. As shown in FIG. 3, in addition to the cam portion 48a, the rotating shaft 44 also includes a connecting portion 44a, a first supported portion 44b and a second supported portion 44c. The first supported portion 44b is slightly smaller in diameter than the connecting portion 44a. The cam portion 48a is larger in diameter than the first supported portion 44b. The cam portion 48a is eccentric from the first supported portion 44b and the second supported portion 44c. The second supported portion 44c is disposed coaxially with the first supported portion 44b. The second supported portion 44c is smaller in diameter than the first supported portion 44b.

Figure 5:
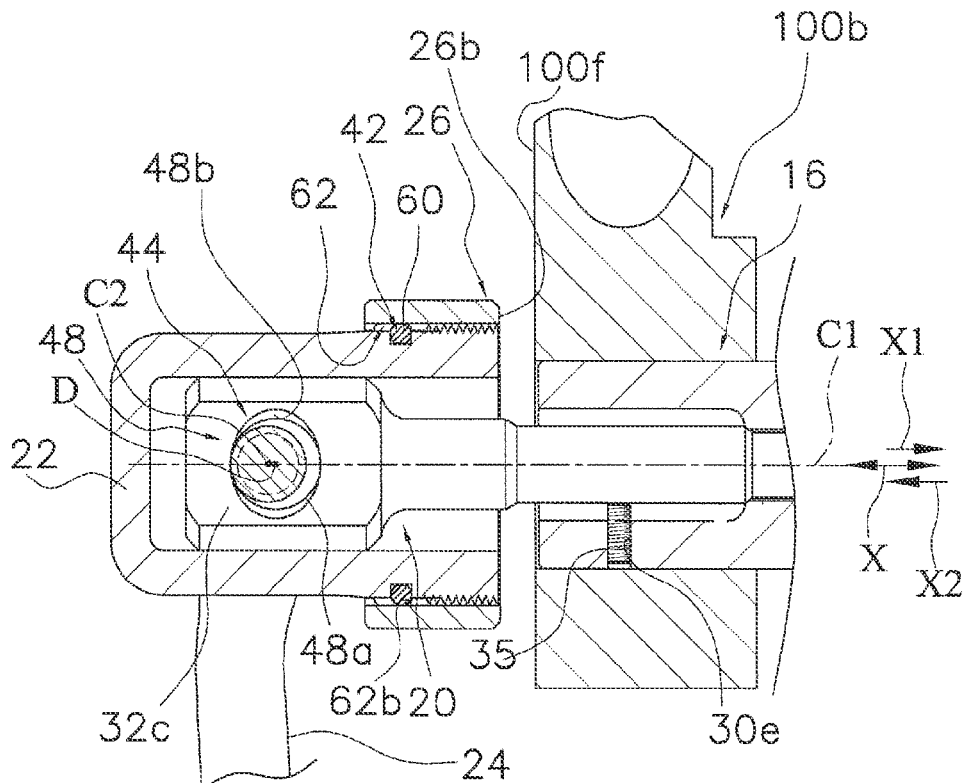
FIG. 5 is a cross-sectional view of the bicycle wheel securing structure when the lever member is disposed in the second position.
Figure 6:
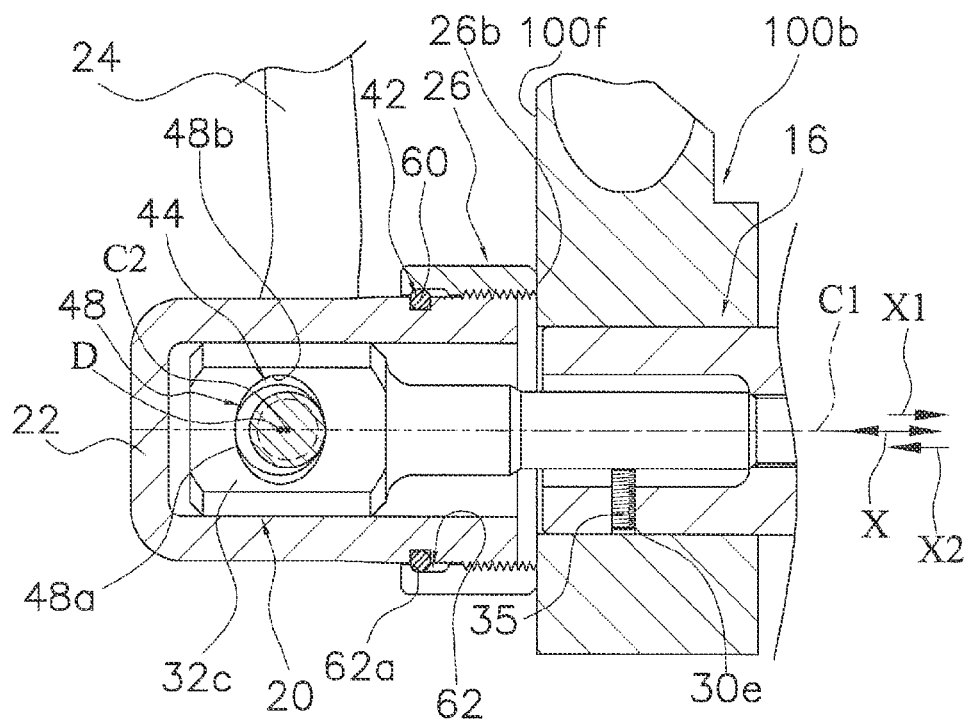
FIG. 6 is a cross-sectional view of the bicycle wheel securing structure when the lever member is disposed in the first position.

The connecting portion 44a is fixedly connected to a first boss portion 46a of the lever main body 46 such that the rotating shaft 44 and the lever main body 46 rotate together as a unit as mentioned below. The connecting portion 44a has a plurality of serrations 44d formed on its outer peripheral part. The serrations 44d results in fine irregularities on the outer peripheral part of the connecting portion 44a. The first supported portion 44b is supported by the first supporting hole 36c via an axle bearing 50. As shown in FIG. 6, the cam portion 48a is circularly formed with a center axis D in a position that is offset from the center axis C2 of the first supported portion 44b. The cam portion 48a engages with the cam hole 48b that is formed in the support portion 32a of the second shaft part 32. The cam structure 48 is configured by this cam portion 48a and the cam hole 48b. The cam hole 48b is formed in an oval shape. FIG. 6 shows a state in which the lever member 24 is disposed in the first position, i.e., the final fixing position. When the lever member 24 is disposed in the first position, the cam portion 48a of the cam structure 48 is most advanced towards the side of the first end portion 20a and moves the shaft member 20 to the side of the first end portion 20a. Additionally, as shown in FIG. 5, when the lever member 24 is disposed in a second position, the cam portion 48a of the cam structure 48 is most retraced from the first end portion 20a. The second supported portion 44c is supported by the second supporting hole 36d via the axle bearing 52. The lever main body 46 includes a second boss portion 46b that is mounted to the second supported portion 44c. On the distal end portion of the second supported portion 44c is formed an annular mounting groove 44e. On the mounting groove 44e is mounted a stopper member 53 that uses a retainer ring, such as an E-shaped retainer ring, for stopping the rotating shaft 44 with respect to the head member 22.

As shown in FIGS. 2 and 3, the lever main body 46 comprises a first boss portion 46a, a second boss portion 46b and a lever part 46c. The second boss portion 46b is fixedly connected to the connecting portion 44a to form an integral unit that rotates together. The second boss portion 46b is connected with the second supported portion 44c. The lever part 46c has proximal ends which are integrally formed with the first boss portion 46a and the second boss portion 46b. The lever member 46c extends in a direction away from the first boss portion 46a and the second boss portion 46b. The first boss portion 46a is provided on one side of the proximal end of the lever part 46c and the second boss portion 46b is provided on the other side. The first boss portion 46a is larger in diameter than the second boss portion 46b. Serrations 46d are formed on the first boss portion 46a. The serrations 46d engage the serration 44d of the connecting portion 44a of the rotating shaft 44 to prevent relative movement between the rotating shaft 44 and the lever main body 46. A circularly recessed housing recess 46e is formed on the second boss portion 46b. The circularly recessed housing recess 46e houses the stopper member 53.

The adjustment member 26 is a short, tubular member. The adjustment member 26 comprises a female threaded portion 26a and a contacting portion 26b. The female threaded portion 26a is formed on the inner peripheral surface and engages the male threaded portion 38b. The contacting portion 26b contacts the outside surface 100f of the first rear end 100b, which is the frame of the bicycle. The female threaded portion 26a is one example of a second threaded portion. The contacting portion 26b is formed on an end surface of the adjustment member 26 that is on the side with the second end portion 20b. By turning the adjustment member 26, the adjustment member 26 moves either in the first axial direction X1 or the second axial direction X2 of the axial direction X. The movement range of the adjustment member 26 is regulated to a prescribed range by the movement regulation part 42.

As shown in FIGS. 2, 3 and 4, the positioning mechanism 28 comprises at least one positioning member 54, at least one engaging portion 56 and a biasing member 58. There is one positioning member 54 in the first embodiment, but there can be a plurality of them. The positioning member 54 is housed by the mechanism housing portion 40 of the head member 22. The positioning member 54 is movably in a radial direction that is perpendicular to the axial direction X. The engaging portion 56 is formed on the inner peripheral surface of the adjustment member 26. The engaging portion 56 in the first embodiment comprises a plurality of arc-shaped recesses 56a that are formed on the inner peripheral surface of the adjustment member 26. The biasing member 58 is, for example, a coil spring that biases the positioning member 54 toward the engaging portion 56.

As shown in FIGS. 2 and 4, the positioning member 54 comprises an engaged portion 54a and a shaft portion 54b.

The shaft portion 54b is integrally formed with the engaged portion 54a. The shaft portion 54b is smaller than the engaged portion 54a. The engaged portion 54a is housed in the first recess 40a of the mechanism housing portion 40. The shaft portion 54b and the biasing member 58 are housed in the second recess 40b. The engaged portion 54a comprises a protrusion 54c that is rectangular in a plan view. The engaged portion 54a is formed protruding in an arc shape that engages with the recess 56a of the engaging portion 56. The radius of the arc of the protrusion 54c is smaller than the radius of the arc of the recess 56a. An annularly recessed locking portion 54d is formed on the opposite side of the protrusion 54c of the engaging portion 54a. The locking portion 54d is provided to lock the biasing member 58.

Regarding the arc-shaped recesses 56a of the engaging portion 56, for example, six are provided on the inner peripheral surface of the adjustment member 26 at intervals in the circumferential direction. Therefore, the adjustment member 26 is positioned at six locations in the axial direction X per one complete rotation about the center axis C1. The number of the recesses 56a can be any number as long as there is a plurality of them. However, four to eight are preferable. The adjustment member 26 is screwed to the head member 22 to adjust the orientation of the lever member 24.

The biasing member 58 is, for example, a coil spring that biases the positioning member 54 toward the engaging portion 56. One end of the biasing member 58 engages with the second recess 40b of the head member 22 and the other end, as mentioned above, is locked to the locking portion 54d.

As shown in FIGS. 2 and 3, the movement regulation part 42 is disposed between the head member 22 and the adjustment member 26. The movement regulation part 42 regulates the movement range of the adjustment member 26 in the axial direction X. Specifically, this part regulates the movement of the adjustment member 26 in the axial direction so that the adjustment member 26 rotates around the center axis C1 by a prescribed amount. The prescribed amount is preferably in the range of one complete rotation to four complete rotations. In the first embodiment, the prescribed amount is two rotations. If the prescribed amount is large, a long time is required for the adjusting operation of the final fixing position of the lever member 24. If the prescribed amount is small, the final fixing position of the lever member 24 cannot be sufficiently adjusted. The movement regulation part 42 comprises a synthetic resin elastic body O-ring 60 and an annular recess 62. The O-ring 60 is mounted to the annular groove 38c. The annular recess 62 is formed on the inner peripheral surface of the adjustment member 26 so as to make contact with the O-ring 60. The annular recess 62 has a length along the axial direction X that is longer than the wire diameter (axially width) of the O-ring 60. The movement of the adjustment member 26 in the first axial direction X 1 is regulated by the first end 62a on the first end portion 20a side of the annular recess 62. The movement of the adjustment member 26 in the second axial direction X2 is regulated by the second end 62b on the second end portion 20b side of the annular recess 62.

In the wheel securing structure 16 configured in this way, in the case that the user attaches the hub 10 to the wheel securing part 100a of the frame for the first time, as shown in FIG. 5, the lever member 24 is disposed in the second position. Additionally, the adjustment member 26 is disposed so that the O-ring 60 makes contact with the second end 62b of the annular recess 62 of the movement regulation part 42. In this state, the user disposes the hub 10 between the first rear end 100b and the second rear end 100c and disposes the hole of the hub shaft 12 so as to be approached from the first through-hole 100d and the second through-hole 100e. Next, the operator inserts the shaft member 20 toward the second through-hole 100e from the first through-hole 100d through the hub shaft 12.

When the shaft member 20 is inserted into the end portion of the second through-hole 100e, the lever member 24 is rotated in the direction to tighten the screw and the male threaded portion 30f of the engaging part 20c of the second end portion 20b of the shaft member 20 is screwed into the female threaded portion of the second through-hole 100e. With this configuration, the head member 22 approaches the outer side surface 100f of the first rear end 100b. Then, the contacting portion 26b of the adjustment member 26 contacts the outer side surface 100f of the first rear end 100b. In this state, when the lever member 24 is rotated from the second position to the first position, as long as the lever member 24 is disposed along the frame, an adjustment is not necessary. However, when it is not, the screw is loosened until the lever member 24 is disposed in a position in which the lever member 24 would be disposed along the frame 100 when the lever member 24 is rotated from the second position to the first position.

Next, the adjustment member 26 is turned and the contacting portion 26b of the adjustment member 26 makes contact with the outer side surface 100f of the first rear end 100b. Then, the lever member 24 is rotated from the second position to the first position. With this adjustment, the fixing of the wheel is completed; from the next time onward, when mounting the wheel, the lever member 24 that is rotated to the first position will be along the frame without having to make an adjustment with the adjustment member 26. Here, since the adjustment member 26 can be positioned in the axial direction X by the positioning mechanism 28, stopping the rotation of the adjustment member 26 can be easily realized with the positioning mechanism 28. Therefore, the rotation of the adjustment member 26 can be easily stopped in a bicycle wheel securing structure 16 that can adjust the position of the lever member 24.

First Modified Example

In the above-described embodiment, the movement regulation part 42 that regulates the movement range of the adjustment member 26 was configured by the O-ring 60 and the annular recess 62, but the present invention is not limited to this configuration. In the following explanations, regarding the parts that are different in shape, etc., from the above-described embodiment, the reference symbols of the above-described embodiment are indicated with three digits and the other parts are given the same reference symbols, with their explanations having been omitted.

Figure 7:
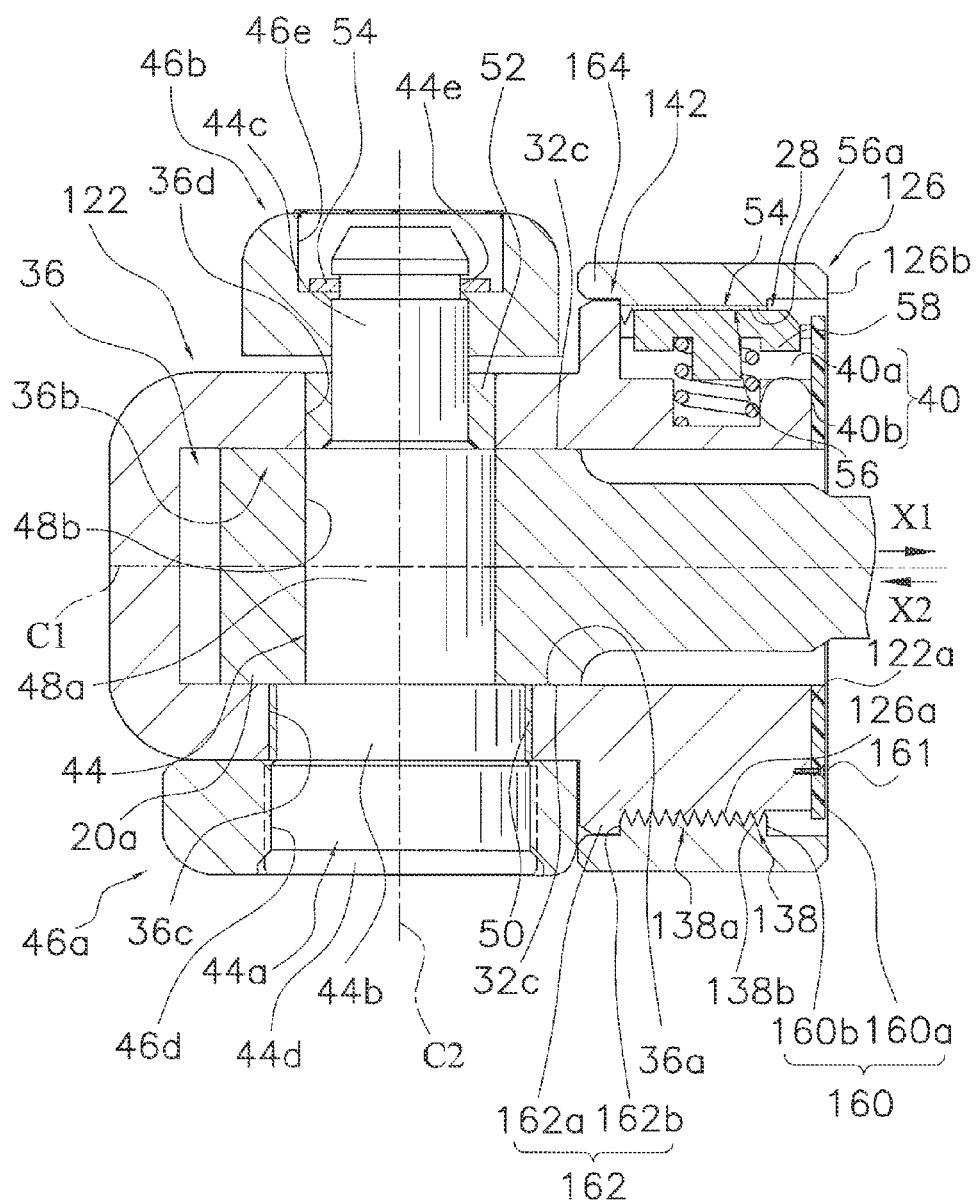
FIG. 7 is a cross-sectional view of a first modified example of the first embodiment of the bicycle wheel securing structure.

As shown in FIG. 7, a movement regulation part 142 of the first modified example comprises a first movement regulation part 160 and a second movement regulation part 162. The first movement regulation part 160 regulates the movement of the adjustment member 126 in the first axial direction X1. The second movement regulation part 162 regulates the movement of the adjustment member 126 in the second axial direction X2.

The first movement regulation part 160 comprises a flange member 160a and a first regulating surface 160b. The flange member 160a is fixed to an end surface 122a on the side of the head member 122 having the second end portion 20b. The flange member 160a radially protrudes farther outside than the outer peripheral surface 138a of the adjustment member 138. The first regulating surface 160b is formed on the inner peripheral surface of the adjustment member 126 so as to contact the flange member 160a. The flange member 160a is fixed, for example, to the end surface 122a of the head member 122 by a plurality of (for example, four) threaded members 161 that are disposed at intervals in the circumferential direction. The first regulating surface 160b is formed on a surface that is perpendicular to the center axis C1 on the side of the female threaded portion 126a of the adjustment member 126 that has the second end portion 20b.

The second movement regulation part 162 comprises a regulating projection 162a and a second regulating surface 162b. The regulating projection 162a is formed on the side of the male threaded portion 138b of the head member 122 having the first end portion 20a. The regulating projection 162a radially protrudes outward. The second regulating surface 162b is formed on the inner peripheral surface of the adjustment member 126 so as to contact the regulating projection 162a. The regulating projection 162a is formed between the shaft housing portion 36 and the adjustment part 38. The regulating projection 162a protrudes in the radial direction, excluding a part of the portion where the lever member 24 is mounted. The second regulating surface 162b is formed on a surface that is perpendicular to the center axis C1 on the side of the first end portion 20a of the female threaded portion 126a of the adjustment member 126. Meanwhile, the flange member 160a is disposed on side of the contacting portion 126b of the adjustment member 126 having the first end portion 20a. The movement of the flange member 160a is regulated by the second movement regulation part 162.

The adjustment member 126 comprises a protruding portion 164 that covers a gap between the adjustment member 126 and the regulating projection 162a that is formed when the adjustment member 126 is separated from the regulating projection 162a. With this configuration, foreign matter will not easily enter the male threaded portion 138b and the positioning mechanism 28. With this configuration, the movement of the adjustment member 126 becomes less likely and the positioning operation of the positioning member 28 will be hindered. Even in a modified example configured in this way, the same effects as those in the above-described embodiment will be achieved.

Second Modified Example

In the second modified example, the second movement regulation part has the same configuration as that in the first modified example, but the first movement regulation part is different from that in the first modified example. In the explanation for the second modified example, regarding the parts that are different in shape, etc., from the above-described embodiment and the first modified example, the reference symbols of the above-described embodiment and the first modified example are indicated with three digits and the other parts are given the same reference symbols, with their explanations having been omitted.

Figure 8:
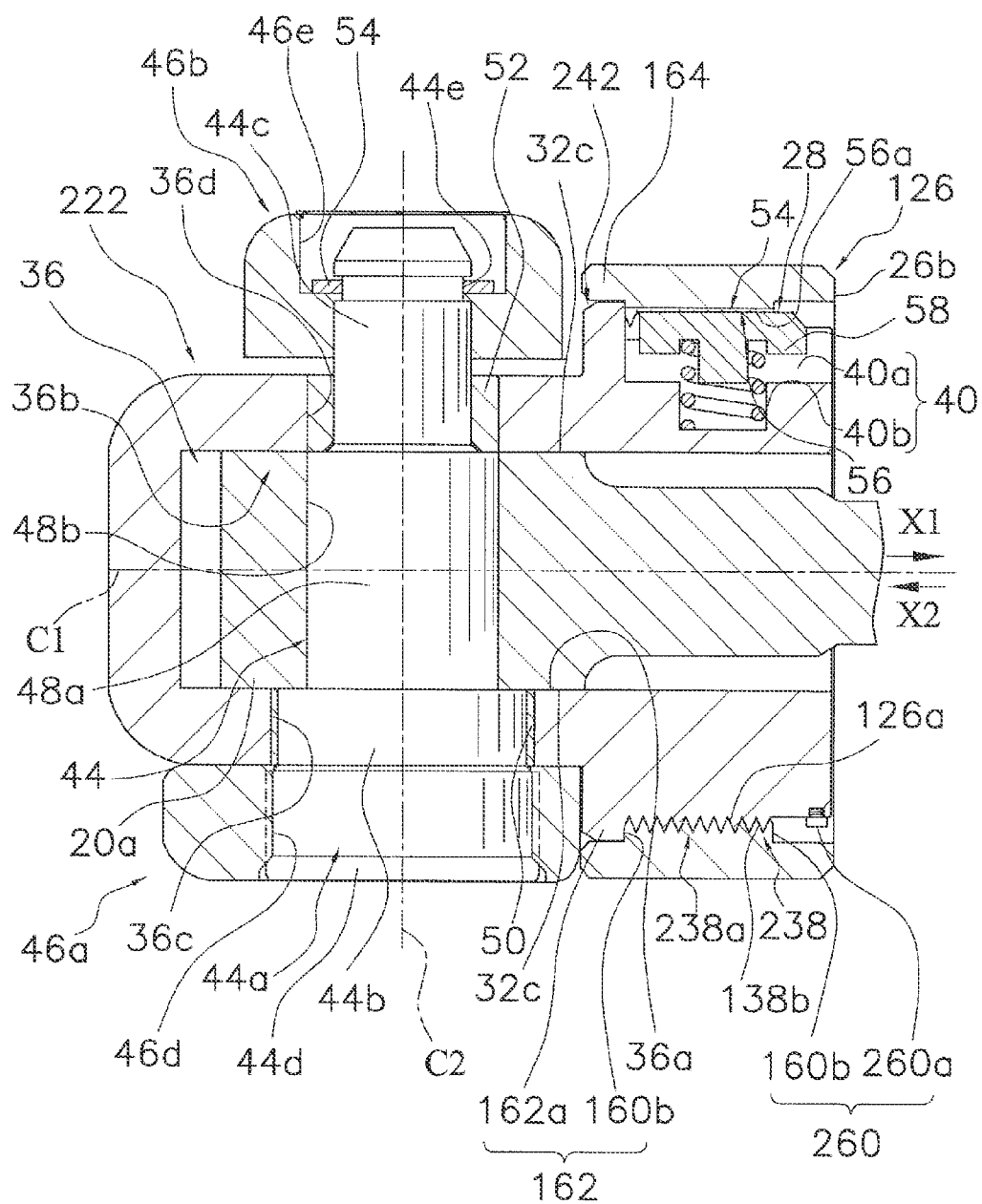
FIG. 8 is a cross-sectional view of a second modified example of the first embodiment of the bicycle wheel securing structure.

As shown in FIG. 8, the movement regulation part 242 of the second modified example comprises a first movement regulation part 260 and a second movement regulation part 162. The first movement regulation part 260 regulates the movement of the adjustment member 126 in the first axial direction X1. The second movement regulation part 162 regulates the movement of the adjustment member 126 in the second axial direction X2. The second movement regulation part 162 is the same configuration as that in the first modified example, so only the configuration of the first movement regulation part 260 will be explained below.

The first movement regulation part 260 comprises a protruding member 260a that is screwed and fixed to the outer peripheral surface 238a of the adjustment part 238 of the head member 222. The protruding member 260a contacts the first regulating surface 160b. Even in the second modified example configured in this way, the same effects as those in the above-described embodiment will be achieved.

Second Embodiment

Figure 9:
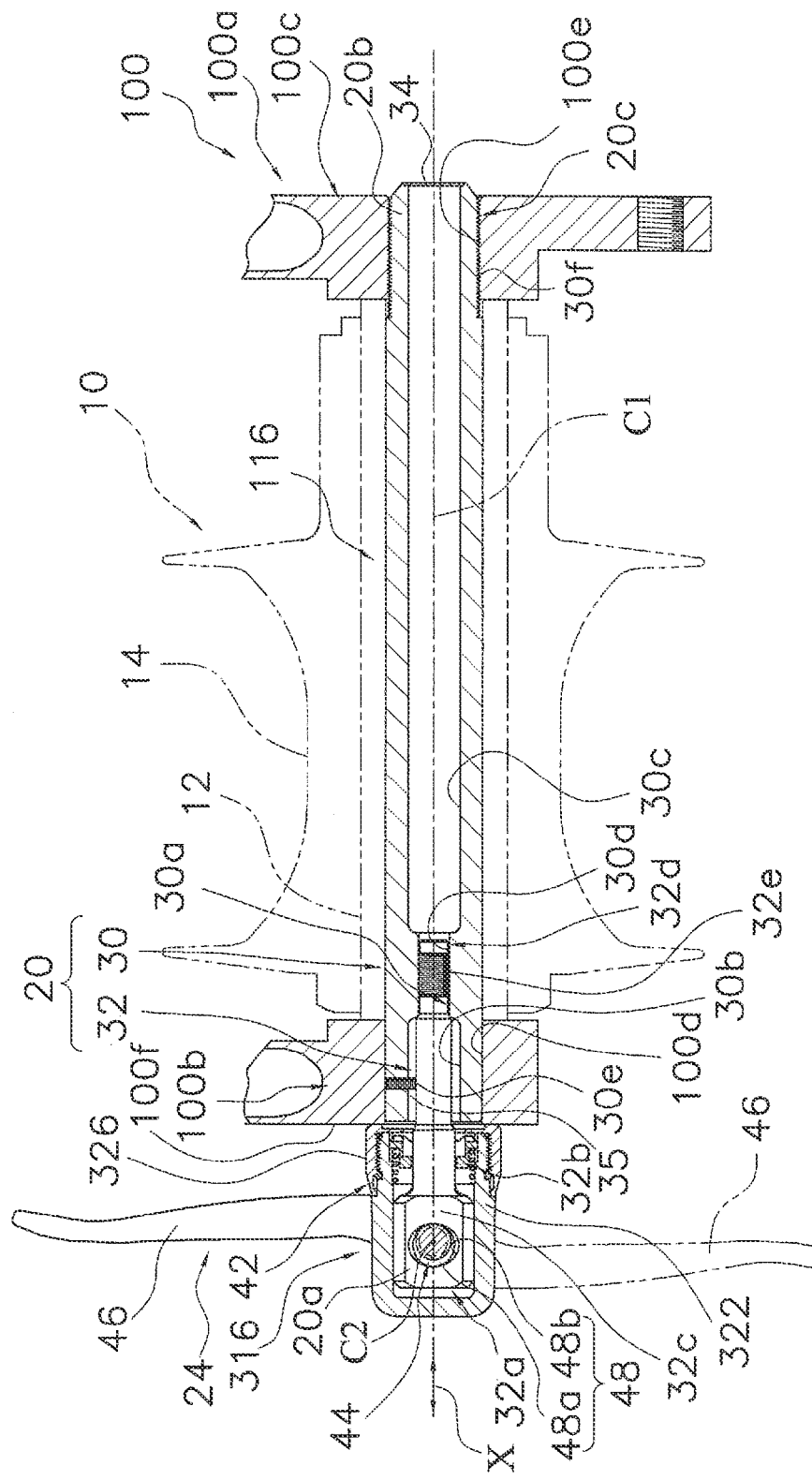
FIG. 9 is a cross-sectional view of the bicycle wheel securing structure according to the second embodiment of the present invention.

In FIG. 9, the bicycle wheel securing structure 316 according to the second embodiment of the present invention fixes a wheel of a bicycle to the frame 100 of the bicycle in the same way as in the first embodiment. Specifically, this structure fixes the hub 10 of the wheel of the bicycle to the frame 100. In the second embodiment, the bicycle hub 10 is a rear hub that can be mounted on the rear part of the frame 100. The hub 10 has the same configuration as that disclosed in the first embodiment, so the explanation has been omitted.

Figure 10:
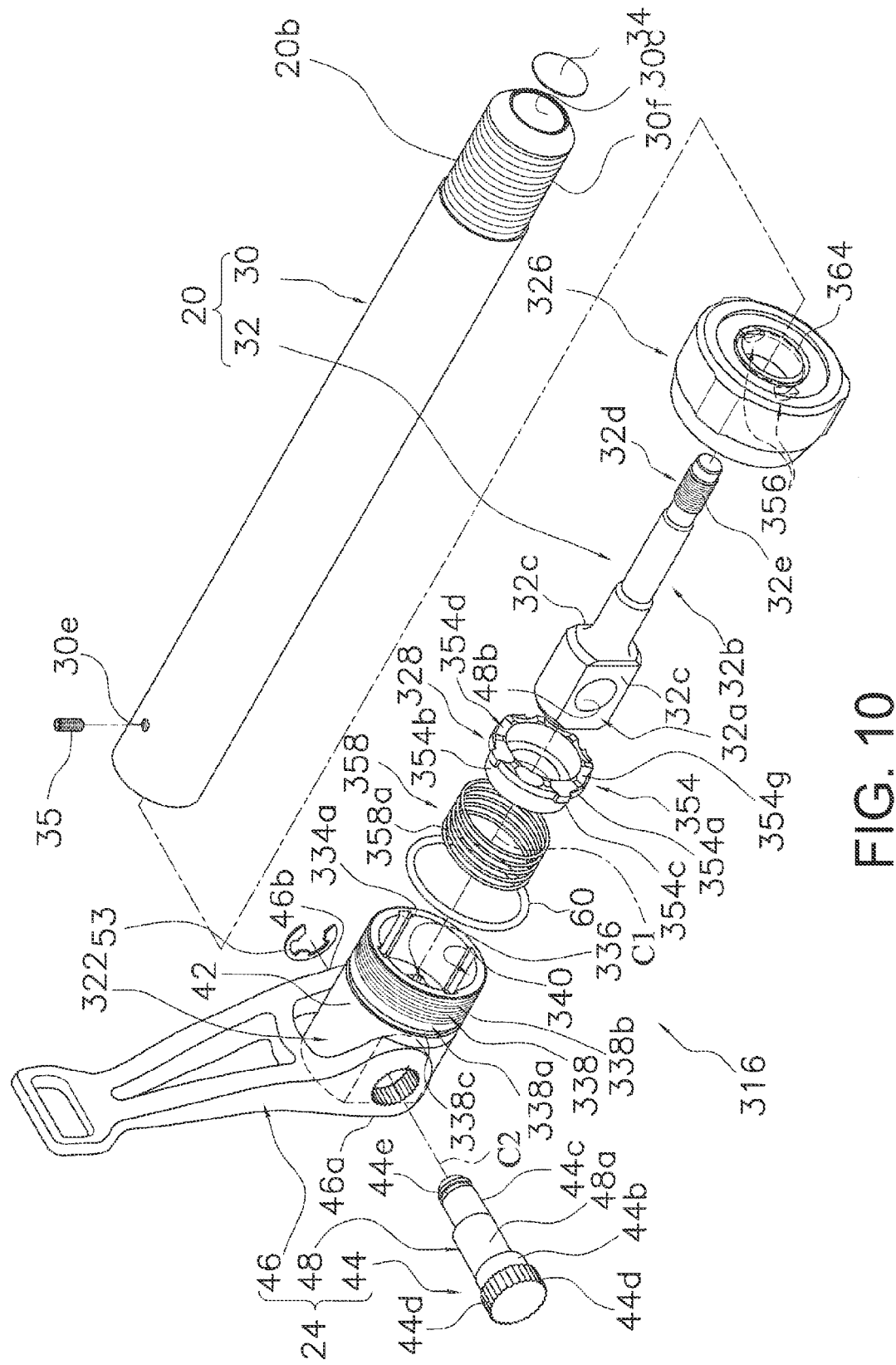
FIG. 10 is an exploded perspective view of the bicycle wheel securing structure according to the second embodiment of the present invention.
Figure 11:
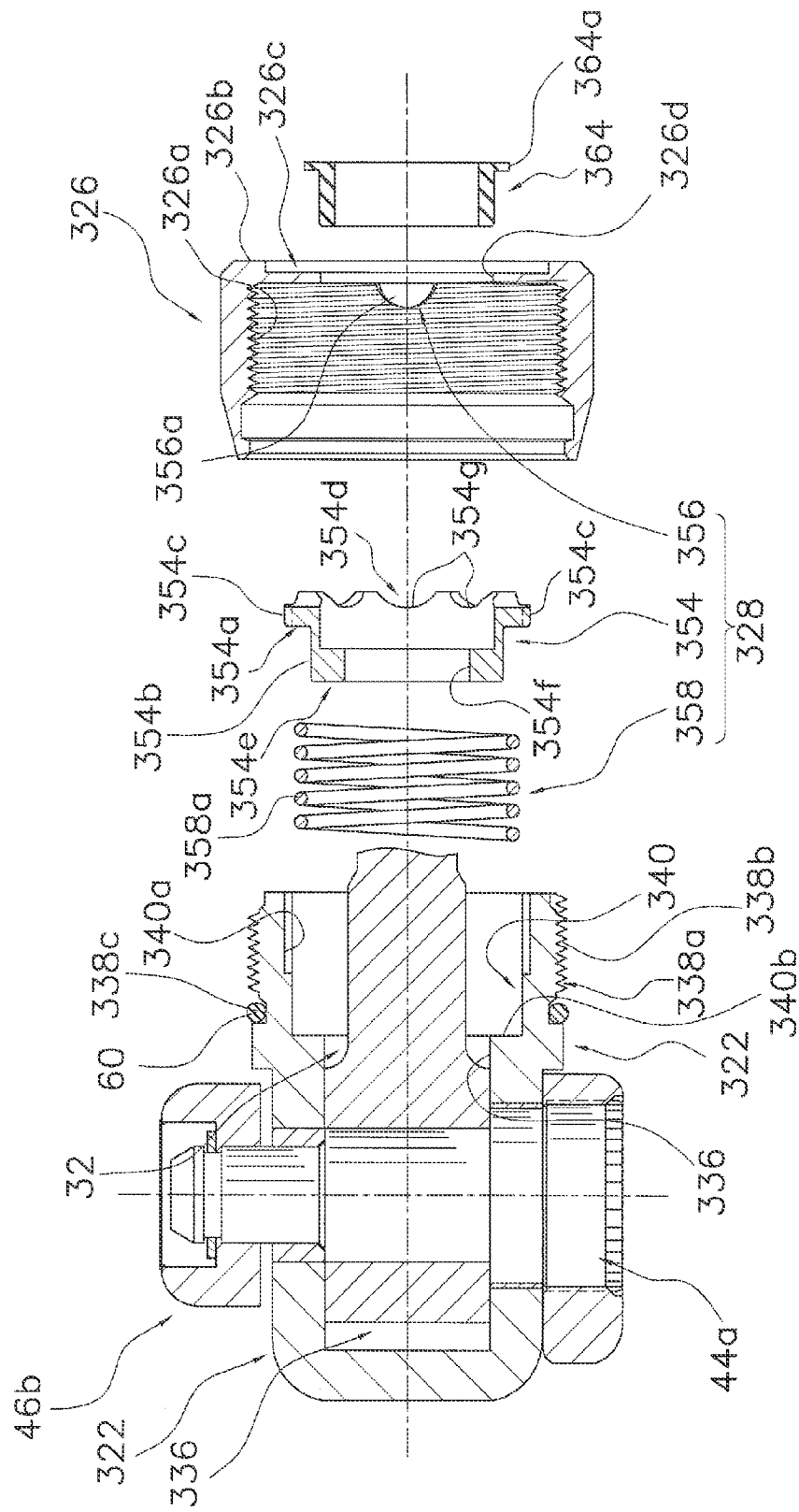
FIG. 11 is an exploded cross-sectional view of the bicycle wheel securing structure near the head member of the bicycle wheel securing structure of the second embodiment.

As shown in FIGS. 9, 10 and 11, the wheel securing structure 316 comprises a shaft member 20, a head member 322, a lever member 24, an adjustment member 326, a positioning member 328 (refer to FIG. 10) and a movement regulation part 42. The shaft member 20 comprises a first end portion 20a, a second end portion 20b and an engaging part 20c. The second end portion 20b is different from the first end portion 20a. The second engaging part 20c is formed in the second end portion 20b for engaging with the frame 100. The head member 322 is provided on the side with the first end portion 20a so as to move, with respect to the shaft member 20, in an axial direction X of a center axis C1 of the shaft member 20. The lever member 24 is movably provided on the head member 322 around an axis C2 that intersects with the center axis C1. The lever member 24 relatively moves the shaft member 20 in the axial direction X of the center axis C1 with respect to the head member 322. The adjustment member 326 is movably provided on the head member 322 in the axial direction X and can adjust the position of the lever member 24 around the center axis C1. The positioning mechanism 328 is provided between the head member 322 and the adjustment member 326 and can move the position of the adjustment member 326 in the axial direction X in a plurality of locations. The movement regulation part 42 regulates the movement of the adjustment member 326 in at least one of either the first axial direction X1, which is the direction away from the head member 22, or the second axial direction X2, which is opposite to the first axial direction X1. In the second embodiment as well, the movement regulation part 42 regulates the movement of the adjustment member 326 in the axial direction X, which includes the first axial direction X1 and the second axial direction X2.

The shaft member 20 comprises the same first shaft part 30 and the second shaft part 32 as in the first embodiment. Therefore, the same reference symbols are given in FIGS. 9 and 10 and the explanation of the configuration of the shaft member has been omitted.

Figure 13:
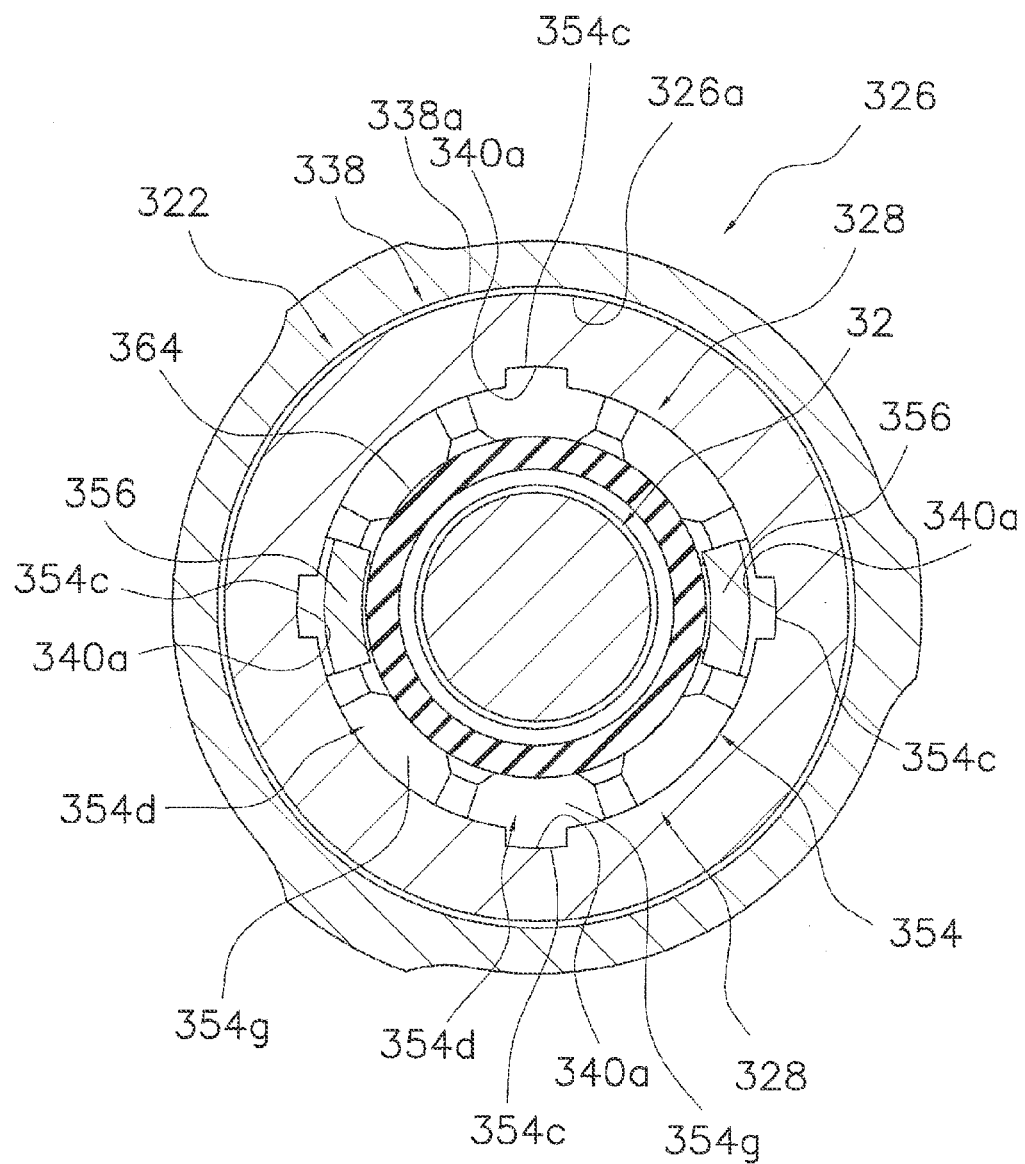
FIG. 13 is a cross-sectional view of the bicycle wheel securing structure taken along the section line XIII-XIII in FIG. 12.

The head member 322, as shown in FIGS. 9 and 13, is a cup-shaped member that has a bottomed tubular shape. The head member 322 houses the support portion 32a of the second shaft part 32 and the positioning mechanism 328. The head member 322 rotatably supports the lever member 24 so as to be disposed in a first position shown by the solid line in FIG. 9, i.e., the final fixing position and a second position shown by the chain double-dashed line. The head member 322 comprises a shaft housing portion 336, an adjustment part 338 and a mechanism housing portion 340. The shaft housing portion 336 houses the support portion 32a of the second shaft part 32 so as to be fixed together as an integral unit that is rotatable around the axis C2 and that is movable in the axial direction X. The adjustment part 338 is provided so that the adjustment member 326 is movable in the axial direction X. The mechanism housing portion 340 movably houses the positioning mechanism 328 in the axial direction X.

Figure 12:
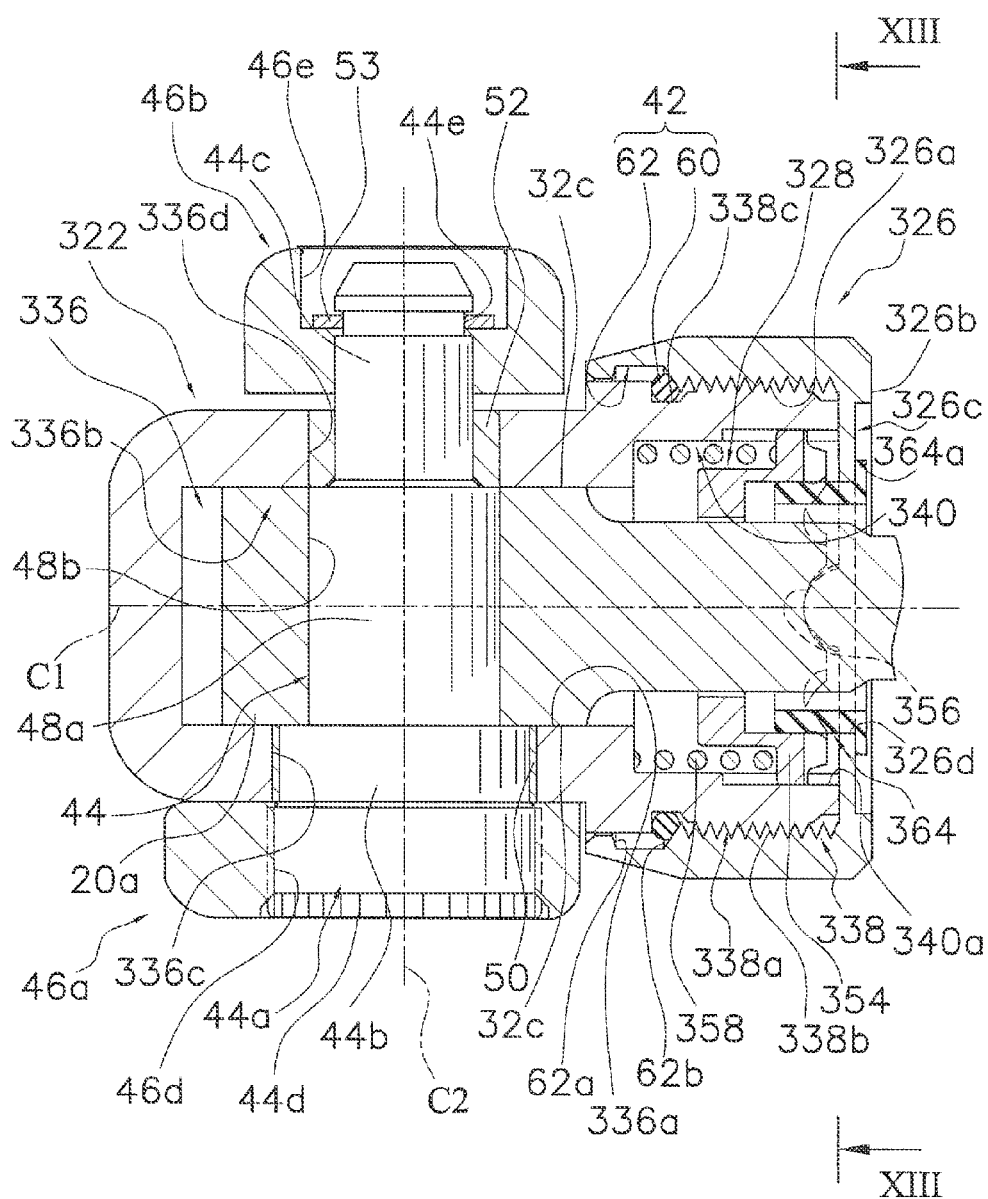
FIG. 12 is a cross-sectional view of the bicycle wheel securing structure near the head member of the bicycle wheel securing structure of the second embodiment.

As shown in FIG. 12, the shaft housing portion 336 has a shorter axial direction length than in the first embodiment. In the same way as in the first embodiment, the shaft housing portion 336 comprises an inner peripheral part 336b that has a pair of planar parts 336a that engage with the pair of planes 32c of the support portion 32a whose cross section is non-circular in shape. On the shaft housing portion 336 are formed a first supporting hole 336c that rotatably supports a rotation shaft 44 of the lever member 24 mentioned below and a second supporting hole 336d that is smaller in diameter than the first supporting hole 336c, so that they extend through the planar part 336a.

The adjustment member 338 comprises a circular outer peripheral surface 338a and a male threaded portion 338b. The male threaded portion 338b engages the adjustment member 326 on the outer peripheral surface 338a. The male threaded portion 338b is an example of a first threaded portion. Additionally, the outer peripheral surface 338a has an annular groove 338c for mounting the O-ring 60 that is a part of the movement regulation part 42. The annular groove 338c is farther on the side having the shaft housing portion 336 than the male threaded portion 338b.

The mechanism housing portion 340 is disposed next to the shaft housing portion 336 in the axial direction X. The mechanism housing portion 340 opens to the distal end portion of the head member 322. On the mechanism housing portion 340 is formed at least one guide groove 340a along the axial direction X for installing a positioning member 354 so as to be immovable around the center axis C1, that is, in the circumferential direction. In the second embodiment, four guide grooves 340a are formed at intervals in the circumferential direction.

The lever member 24 is configured in the same way as in the first embodiment. Basically, the lever member 24 comprises the rotating shaft 44, the lever main body 46 and a part of the cam structure 48 as mentioned above. When the lever member 24 is disposed in the first position, the shaft member 20 is moved toward the first end portion 20a. Additionally, when the lever member 24 is disposed in the second position, the cam portion 48a of the cam structure 48 is most retracted from the first end portion 20a. The behavior of the lever member 24 is the same as that in the first embodiment.

As shown in FIGS. 11, 12 and 13, the adjustment member 326, is a bottomed tubular member with a short axial direction length. The adjustment member 326 is a bottomed tubular member comprising projections that are disposed on the outer peripheral surface at intervals in the circumferential direction. The adjustment member 326 comprises a female threaded portion 326a and a contacting portion 326b. The female threaded portion 326a is formed on the inner peripheral surface and engages with the male threaded portion 338b. The contacting portion 326b contacts the outside surface 100f of the first rear end 100b, which is the frame of the bicycle. A knurl that is not shown is formed on the contacting portion 326b. Additionally, the adjustment member 326 comprises a base portion on which is provided the positioning mechanism 328. The base portion 326c is disposed farther on the side with the second axial direction X2 than the contacting portion 326b. A center hole 326d is formed on the base portion 326c. A tubular cap member 364 is fixed to the center hole 326d. The tubular cap member 364 has an attaching portion 364a. The attaching portion 364a is disposed farther on the side of the second axial direction X2 than the contacting portion 326b. The cap member 364 is provided to prevent foreign material entering the mechanism housing portion 340.

The female threaded portion 326a is one example of a second threaded portion. The contacting portion 326b is formed on an end surface on the adjustment member 326 on the side of the second end portion 20b. By turning the adjustment member 326, the adjustment member 326 can move in the first axial direction X1 and the second axial direction X2 of the axial direction X. The movement range of the adjustment member 326 is regulated to a prescribed range by the movement regulation part 42.

The positioning mechanism 328, as shown in FIGS. 10, 11, 12 and 13, comprises at least one positioning member 354, at least one engaging portion 356 and a biasing member 358. There is one positioning member 354 in the second embodiment and this is movably housed in the mechanism housing portion 340 of the head member 322 in the axial direction X. Two engaging portions 356 are provided in the second embodiment, but there can be one. In the second embodiment, the two engaging portions 356 comprise a plurality of protrusions 356a formed protruding in an arc-shape on a surface that opposes the positioning member 354 on the base portion 326c of the adjustment member 226. The plurality of protrusions 356a is disposed at 180 degree intervals.

As shown in FIGS. 11 and 13, the positioning member 354 comprises a flange portion 354a, a tubular portion 354b, at least one guide portion 354c and a plurality of engaged portions 354d. The guide portion 354c is provided for stopping the rotation. The engaged portions 354d engage with the engaging portion 356. The flange portion 354a is formed to lock the biasing member 358. The tubular portion 354b comprises a base portion 354e on which is formed a through-hole 354f through which the second shaft part 32 can extend. The inner peripheral surface of the tubular portion 354b abuts the outer peripheral surface of the cap member 364. In the second embodiment, four guide portions 354c are formed to engage with four guide grooves 340a. The guide portion 354c protrudes rectangularly in the radial direction from the outer peripheral surface of the flange portion 354a.

The engaged portion 354d comprises a plurality of (for example, eight) recesses 354g that are formed recessed in an arc-shape on an end surface on the opposite side of the base portion 354e of the tubular portion 354b. The radius of the arc of the recess 354g is larger than the radius of the arc of the protrusion 356a. The recesses 354g are disposed around the center axis C1 at intervals. The adjustment member 326 is screwed to the head member 322. Therefore, the adjustment member 326 is positioned at eight locations per one complete rotation in the axial direction X by the positioning mechanism 328. The number of the recesses 354g can be any number as long as there is a plurality; however, four to ten are preferable. The biasing member 358 is, for example, a coil spring 358a, that biases the positioning member 354 toward the engaging portion 356. The coil spring 358a is disposed between the flange portion 354a of the positioning member 354 and a stepped surface 340b, which is between the mechanism housing portion 340 and the shaft housing portion 336.

As shown in FIG. 12, the movement regulation part 42 has the same configuration as in the first embodiment, so the detailed explanation has been omitted. The movement regulation part 42 is disposed between the head member 322 and the adjustment member 326. The movement regulation part 42 regulates the movement range of the adjustment member 326 in the axial direction X. Specifically, the movement regulation part regulates the movement of the adjustment member 26 in the axial direction so that the adjustment member 326 rotates around the center axis C1 by a prescribed amount. The prescribed amount is preferably in the range of one rotation to four rotations; in the second embodiment, the prescribed amount is two rotations.

In the wheel securing structure 316 configured in this way as well, in the case that the user attaches the hub 10 to the wheel securing part 100a of the frame for the first time, in the same way as in the first embodiment, the lever member 24 is disposed in the second position. Additionally, the adjustment member 326 is disposed so that the O-ring 60 makes contact with the second end 62b of the annular recess 62 of the movement regulation part 42, as shown in FIG. 12. In this state, the user disposes the hub 10 between the first rear end 100b and the second rear end 100c and disposes the hole of the hub shaft 12 so that the hole can be approached from the first through-hole 100d and the second through-hole 100e. Next, the operator inserts the shaft member 20 toward the second through-hole 100e from the first through-hole 100d through the hub shaft 12.

When the shaft member 20 is inserted into the end portion of the second through-hole 100e, the lever member 24 is rotated in the direction that tightens the screw and the male threaded portion 30f of the engaging part 20c of the second end portion 20b of the shaft member 20 is screwed into the female threaded portion of the second through-hole 100e. With this configuration, the head member 322 approaches the outer side surface 100f of the first rear end 100b. Then, the contacting portion 326b of the adjustment member 326 makes contact with the outer side surface 100f of the first rear end 100b. In this state, when the lever member 24 is rotated from the second position to the first position, as long as the lever member 24 is disposed along the frame, an adjustment is not necessary. However, when it is not, the screw is loosened until the lever member 24 is disposed in a position in which the lever member 24 would be disposed along the frame when the lever member 24 is rotated from the second position to the first position.

Next, the adjustment member 326 is turned and the contacting portion 326b of the adjustment member 326 makes contact with the outer side surface 100f of the first rear end 100b. Then, the lever member 24 is rotated from the second position to the first position. With this, the fixing of the wheel is completed. From the next time onward, when mounting the wheel, the lever member 24 that is rotated to the first position will be along the frame without needing to make adjustment with the adjustment member 326. Here, since the adjustment member 326 can be positioned in the axial direction X by the positioning mechanism 328, stopping the rotation of the adjustment member 326 can be easily realized with the positioning mechanism 328. Therefore, the rotation of the adjustment member 326 can be easily stopped in a bicycle wheel securing structure 316 that can adjust the position of the lever member 24.

While only selected embodiments have been chosen to illustrate the present invention, it will be apparent to those skilled in the art from this disclosure that various changes and modifications can be made herein without departing from the scope of the invention as defined in the appended claims.

(a) In the above-described two embodiments, a rear hub was exemplified as a bicycle hub, but the bicycle hub that uses the bicycle wheel securing structure 16 (or 316) according to the present invention is not limited to this. For example, the present invention can be applied to a wheel securing structure that is used for a front hub.

(b) In the above-described two embodiments, the engaging portion 20c was configured by a male threaded portion, but the present invention is not limited to this configuration. The engaging portion can be an engaging structure besides a screw. For example, a pin member that is disposed to the wheel securing structure along the radial direction can be the engaging portion. In this case, an engaging groove that engages with the pin member by turning the pin member can be provided on the frame.

(c) In the above-described two embodiments, the lever member 24 was mounted on both ends of the rotating shaft 44, but the lever member 22 can be fixedly connected to only one end of the rotating shaft 4 to form an integral unit that rotates together.

(d) In the above-described two embodiments, the shaft member 20 was configured by two shaft parts, the first shaft part 30 and the second shaft part 32, but the present invention is not limited to this configuration. The shaft member can be configured by one shaft part.

(e) In the above-described two embodiments, a bicycle wheel securing structure that extends through a through-hole of the frame was disclosed, but the present invention is not limited to this configuration. The present invention can be applied to a bicycle wheel securing structure that is mounted to a groove that is formed in the frame.

(f) In the first embodiment, the engaging portion 56 included a recess 56a and the engaged portion 54a included a protrusion 54c; however, the present invention is not limited to this. For example, the engaging portion 56 can include a protrusion and the engaged portion 54a can include a recess.

(g) In the second embodiment, the engaging portion 356 included a protrusion 356a and the engaged portion 354d included a recess 354g. However, the present invention is not limited to this configuration. For example, the engaging portion 356 can include a recess and the engaged portion 354d can include a protrusion.

Thus, the foregoing descriptions of the embodiments according to the present invention are provided for illustration only, and not for the purpose of limiting the invention as defined by the appended claims and their equivalents.

What is claimed is:

1. A bicycle wheel securing structure comprising:
   a shaft member having a first end portion, a second end portion that is different from the first end portion and an engaging part that is formed in the second end portion and that is configured to engage with a frame of a bicycle;
   a head member movably disposed on the first end portion, the head member having a circular outer peripheral surface with a first threaded portion formed on the outer peripheral surface; and
   a lever member movably provided on the head member around a pivot axis that intersects with an axial direction of the shaft member to move the shaft member in the axial direction with respect to the head member;
   an adjustment member movably provided on the head member in the axial direction and that can adjust a final fixing position of the lever member, the adjustment member having a second threaded portion that screws onto the first threaded portion and a contacting portion arranged to contact with the frame while the bicycle wheel securing structure is secured to the frame; and
a positioning mechanism provided between the head member and the adjustment member to selectively maintain a position of the adjustment member in a plurality of axially spaced apart locations.

2. The bicycle wheel securing structure as recited in claim 1, wherein
the shaft member comprises a first shaft part and a second shaft part, the first shaft part including the second end portion and the engaging part, the second shaft part including the first end portion, the second shaft part being a separate member that is attached to the first shaft part, and the second shaft part being partially covered by the head member.

3. The bicycle wheel securing structure as recited in claim 1, wherein
at least one positioning member that is movably disposed in a direction that is perpendicular to the axial direction of one of the head member and the adjustment member and that is immovably in a circumferential direction with respect to the one of the head member and the adjustment member having the at least one positioning member provided thereon;
an engaging portion that is provided on the other of the head member and the adjustment member, the engaging portion is arranged to engage the positioning member in one of a plurality of circumferentially arranged locations; and
a biasing member that biases the positioning member toward the engaging portion.

4. The bicycle wheel securing structure as recited in claim 3, wherein
the positioning member is provided in the head member.

5. The bicycle wheel securing structure as recited in claim 4, wherein
the positioning member comprises a plurality of circumferentially spaced apart recesses, and
the engaging portion comprises at least one protrusion that engages the recesses.

6. The bicycle wheel securing structure as recited in claim 1, further comprising
a movement regulation part arranged to regulate movement of the adjustment member in at least one of a first axial direction and a second axial direction that is opposite to the first axial direction.

7. The bicycle wheel securing structure as recited in claim 6, wherein
the movement regulation part regulates the movement in both the first axial direction and the second axial direction.

8. The bicycle wheel securing structure as recited in claim 7, wherein
the movement regulation part regulates the movement of the adjustment member in the first and second axial directions so that the adjustment member rotates around a center axis of the shaft member by a prescribed amount.

9. The bicycle wheel securing structure as recited in claim 8, wherein
the movement regulation part comprises:
an O-ring that is disposed on one of the head member and the adjustment member; and
an annular recess that is formed on the other of the head member and the adjustment member, the O-ring being disposed in the annular recess, the annular recess having a longer length as measured in the axial direction than a width of the O-ring as measured in the axial direction.

10. The bicycle wheel securing structure as recited in claim 9, wherein
the O-ring is mounted on an annular groove formed in the head member, and
the annular recess is formed on an inner peripheral surface of the adjustment member.

11. The bicycle wheel securing structure as recited in claim 6, wherein
the movement regulation part comprises a flange member that is disposed in the head member in order to regulate the movement in the first axial direction.

12. The bicycle wheel securing structure as recited in claim 6, wherein
the movement regulation part comprises a protruding member that is disposed in the head member in order to regulate the movement in the first axial direction.

13. The bicycle wheel securing structure as recited in claim 6, wherein
the movement regulation part comprises a regulating projection that is located on an outer peripheral surface of the head member so as to contact the adjustment member in order to regulate the movement of the adjustment member in the second axial direction.

14. The bicycle wheel securing structure as recited in claim 13, wherein
the adjustment member comprises a protruding portion that covers a gap between the adjustment member and the regulating projection in which the gap is formed when the adjustment member is separated from the regulating projection.

15. The bicycle wheel securing structure as recited in claim 1, wherein
the lever member comprises a lever main body and a rotating shaft, the lever main body being fixedly coupled to the rotating shaft which is rotatably coupled to the head member to pivot around the pivot axis; and
the shaft member is coupled to the rotating shaft by a cam structure that move the shaft members in the axial direction with respect to the head member in response to rotation of the lever main body about the pivot axis.

16. A bicycle wheel securing structure comprising:
a shaft member having a first end portion, a second end portion that is different from the first end portion and an engaging part that is formed in the second end portion and that is configured to engage with a frame of a bicycle;
a head member movably disposed on the first end portion; and
a lever member movably provided on the head member around a pivot axis that intersects with an axial direction of the shaft member to move the shaft member in the axial direction with respect to the head member;
an adjustment member movably provided on the head member in the axial direction and that can adjust a final fixing position of the lever member; and
a positioning mechanism provided between the head member and the adjustment member to selectively maintain a position of the adjustment member in a plurality of axially spaced apart locations, the positioning mechanism comprising:

at least one positioning member that is movably arranged in a direction that is perpendicular to the axial direction of one of the head member and the adjustment member, an engaging portion that is provided on the other of the head member and the adjustment member, the engaging portion is arranged to engage the positioning member in one of a plurality of circumferentially arranged locations, and a biasing member that biases the positioning member toward the engaging portion.

17. The bicycle wheel securing structure as recited in claim 16, wherein the positioning member is movably provided on the head member.

18. The bicycle wheel securing structure as recited in claim 17, wherein the engaging portion comprises a plurality of circumferentially spaced apart recesses, and the positioning member comprises at least one protrusion that engages the recesses.

19. A bicycle wheel securing structure comprising:

a shaft member having a first end portion, a second end portion that is different from the first end portion and an engaging part that is formed in the second end portion and that is configured to engage with a frame of a bicycle;

a head member movably disposed on the first end portion; and a lever member movably provided on the head member around a pivot axis that intersects with an axial direction of the shaft member to move the shaft member in the axial direction with respect to the head member;

an adjustment member movably provided on the head member in the axial direction and that can adjust a final fixing position of the lever member; and a positioning mechanism provided between the head member and the adjustment member to selectively maintain a position of the adjustment member in a plurality of axially spaced apart locations, the positioning mechanism comprising at least one positioning member that is movably arranged with respect to one of the head member and the adjustment member, and an engaging portion that is provided on the other of the head member and the adjustment member, the engaging portion is arranged to engage the positioning member in one of a plurality of circumferentially arranged locations.

* * * * *